US010099423B2

(12) United States Patent
Wang et al.

(10) Patent No.: US 10,099,423 B2
(45) Date of Patent: Oct. 16, 2018

(54) METHODS FOR JOINING COMPONENTS BY HEAT STAKING

(71) Applicant: GM GLOBAL TECHNOLOGY OPERATIONS LLC, Detroit, MI (US)

(72) Inventors: Pei-Chung Wang, Troy, MI (US); Bradley J. Blaski, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 715 days.

(21) Appl. No.: 14/634,752

(22) Filed: Feb. 28, 2015

(65) Prior Publication Data

US 2016/0250804 A1 Sep. 1, 2016

(51) Int. Cl.
| | |
|---|---|
| *B29C 65/30* | (2006.01) |
| *B29C 65/60* | (2006.01) |
| *F16B 5/04* | (2006.01) |
| *B29C 65/00* | (2006.01) |
| B29C 65/18 | (2006.01) |
| B29C 65/34 | (2006.01) |
(Continued)

(52) U.S. Cl.
CPC ........ *B29C 65/606* (2013.01); *B29C 66/1122* (2013.01); *B29C 66/21* (2013.01); *B29C 66/45* (2013.01); *B29C 66/721* (2013.01); *B29C 66/7392* (2013.01); *B29C 66/81875* (2013.01); *B29C 66/81885* (2013.01); *B29C 66/8322* (2013.01); *F16B 5/045* (2013.01); *B29C 65/18* (2013.01); *B29C 65/30* (2013.01); *B29C 65/3408* (2013.01); *B29C 65/3476* (2013.01); *B29C 65/64* (2013.01); *B29C 66/71* (2013.01); *B29C 66/7212* (2013.01); *B29C 66/73921* (2013.01); *B29C 66/742* (2013.01); *B29C 66/7422* (2013.01); *F16B 43/00* (2013.01)

(58) Field of Classification Search
CPC ....... B29C 66/21; B29C 66/45; B29C 66/721; B29C 66/7392; B29C 66/81875; B29C 66/81885; B29C 66/742; B29C 66/7422; B29C 66/7212; B29C 65/3408; B29C 65/3476; B29C 65/64; B29C 65/30
See application file for complete search history.

(56) References Cited

U.S. PATENT DOCUMENTS

| | | | | |
|---|---|---|---|---|
| 5,749,256 | A * | 5/1998 | Bodnar | B21D 28/243 29/897.3 |
| 2002/0017744 | A1* | 2/2002 | Lochner | B21J 15/08 264/479 |

(Continued)

*Primary Examiner* — Jacob Cigna
*Assistant Examiner* — Lee A Holly
(74) *Attorney, Agent, or Firm* — Cynthia R. Parks; Parks IP Law LLC (57) ABSTRACT

The present technology discloses methods for joining a first workpiece and a second workpiece through a heat stake, and products formed thereby. The first workpiece has an aperture configured to receive a stud positioned on a second workpiece. The system is formed by applying energy to the first workpiece using electrodes, which indirectly heats the stud, at least partially softening material of the stud. Pressure is then applied to the softened material of the stud, and causing the material to form according to a predetermined geometry. After pressure is released, the stud forms a stake forming an interlocked joint connecting the workpieces.

13 Claims, 3 Drawing Sheets

(51) Int. Cl.
 *B29C 65/64* (2006.01)
 *F16B 43/00* (2006.01)

(56) References Cited

U.S. PATENT DOCUMENTS

2002/0187020 A1\* 12/2002 Julien .................. F16B 1/0014
 411/544
2014/0219710 A1\* 8/2014 Ezzat ..................... B29C 65/30
 403/270

\* cited by examiner

Fig_1

Fig_3

METHODS FOR JOINING COMPONENTS BY HEAT STAKING

TECHNICAL FIELD

The present technology relates generally to joining components. More specifically, the present technology relates to systems and methods for joining workpieces using heat staking.

BACKGROUND OF THE DISCLOSURE

Joining workpieces with similar or dissimilar material properties has become increasingly important as industries strive for reduced weight and improved performance from engineering structures such as automotive, aeronautical, and nautical, among others. Staking has the capacity to join dissimilar plastics to one another or join plastics to other materials (e.g., metal). Staking has the advantage over other mechanical joining methods in eliminating the need for additional components such as rivets and screws.

Traditional staking connects workpieces by creating an interference with a first workpiece including a hole and a second workpiece including a stud that inserts into the hole of the first workpiece. A staking punch is then used to compress the stud axially, which reforms material within the stud into a stake that permanently joins the workpieces without the use of additional components such as screws and rivets.

Similar to traditional staking, heat staking begins with a plastic stud on a second workpiece being inserted into a hole located within the first workpiece. However, in heat staking, material within the plastic stud is reformed using controlled heating and melting to produce a stake which mechanically locks the workpieces together without the use of additional components such as screws and rivets.

Reformation of the plastic stud is traditionally achieved by heating material of the plastic stud, using super-heated air or a thermode, above a glass-transition temperature associated with the material, creating a softened material. Pressure is then applied to the softened material in order to create the stake.

Using super-heated air to heat the material of the plastic stud requires the use of hot air jets, which often over time lead costly maintenance of components such as individual flow meters associated with the hot air jets. Also, using a thermode to heat the material of the plastic stud can require additional processing time for each stake because the thermode is heated and cooled down for each connection. Additionally, hot air jets and use of multiple thermodes for multiple connections can require lengthy tooling changeover times.

SUMMARY OF THE DISCLOSURE

Due to the aforementioned deficiencies, the need exists for systems and methods to join securely, by heat staking, workpieces that contain dissimilar materials without using material other than material of the workpieces for forming the joint. The proposed systems and methods would join the workpieces by mechanically interlocking the materials of the workpieces utilizing heating of one workpiece (single-sided heating) or heating of two workpieces (double-sided heating).

The present technology includes a system that joins a first workpiece with a second workpiece using a stud reformed into a finished stake. The first workpiece includes an aperture, and the second workpiece includes the stud configured to be received by the aperture within the first workpiece. When the workpieces are positioned for joining, the stud is received through the aperture of the first workpiece, entering the aperture at a first opening, in a first surface, of the first workpiece, and reaching a final position in which the stud extends out of the first workpiece through a second opening, in a second surface, of the first workpiece being generally opposite the first surface. In the final position, then, a portion of the stud protrudes from the second surface of the first workpiece.

The first workpiece and the second workpiece are joined using a punch assembly including a first electrode and a second electrode, which are electrically isolated from one another. Each electrode is configured to transfer energy directly to at least a portion of the first workpiece and transfer energy indirectly to and soften at least a portion of the stud located on the second workpiece when the workpieces are positioned for joining.

In some embodiments, the first electrode and the second electrode are electrically isolated using an insulator. The insulator reduces or prevents current between the electrodes.

The punch assembly also includes a punch, positioned between the electrodes. The punch contains a probe tip with a predetermined geometry which dictates a shape of a portion of the finished stake. The predetermined geometry can be of a shape and size suitable for a desired application.

In some embodiments, the probe tip of the punch is heated before and during, or at least during compression of the stud in forming the stake in joining the workpieces. Where the probe tip is heated, thermal energy, in addition to the thermal energy generated by the electrodes, is transferred to material of the stud aiding in reformation.

In some embodiments, the first workpiece includes a pattern configured to enhance interlock between softened material of the stud and the first workpiece. The pattern can include protrusions within the first surface of the first workpiece. The pattern, additionally or alternatively, includes pockets on the second surface of the first workpiece that correspond to the protrusions on the first surface of the first workpiece. The pockets form a void within the second surface of the first workpiece that is filled by material of the second workpiece during heat staking.

The pattern is embossed into the workpiece in a particular embodiment. The pattern can be located near or adjacent the aperture, and in some implementations fully or at least partially surrounds the aperture.

Other aspects of the present technology will be in part apparent and in part pointed out hereinafter.

DETAILED DESCRIPTION

As required, detailed embodiments of the present disclosure are disclosed herein. The disclosed embodiments are merely examples that may be embodied in various and alternative forms, and combinations thereof. As used herein, for example, exemplary, illustrative, and similar terms, refer expansively to embodiments that serve as an illustration, specimen, model or pattern.

The figures are not necessarily to scale and some features may be exaggerated or minimized, such as to show details of particular components. In some instances, well-known components, systems, materials or methods have not been described in detail in order to avoid obscuring the present disclosure. Specific structural and functional details disclosed herein are therefore not to be interpreted as limiting, but merely as a basis for the claims and as a representative basis for teaching one skilled in the art to variously employ the present disclosure.

I. OVERVIEW OF THE TECHNOLOGY—FIGS. 1 AND 2

Figure 1:
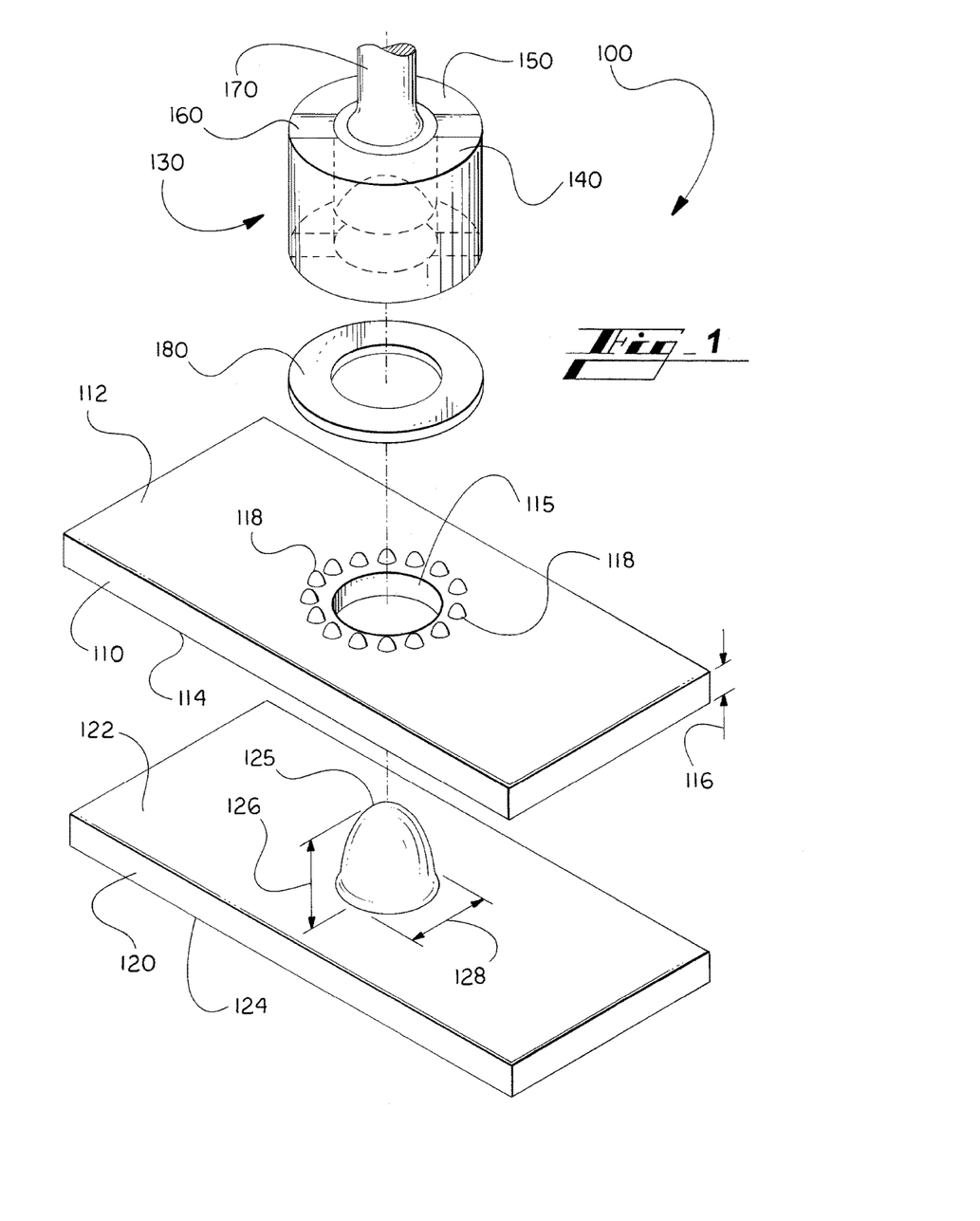
FIG. 1 illustrates an exploded perspective view of an example joining system for producing a heat-staked joint using a punch assembly to join a first workpiece and a second workpiece.

FIG. 1 illustrates a joining system 100 including a first workpiece 110 and a second workpiece 120. The first workpiece 110 includes a first surface 112 and a second surface 114 opposite the first surface. Similarly, the second workpiece 120 includes a first surface 122 and a second surface 124 that is opposite the first surface. The second surface 114 of the first workpiece 110 and the first surface 122 of the second workpiece 120 contact each other as a result of joining.

In some embodiments, the first workpiece 110 includes a void, hollow, or aperture 115. While the term hole is primarily used herein for simplicity, the term is not intended to limit the scope of the technology as other terms, as mentioned above, can be used in place thereof.

The aperture 115 extends between a first opening, in the first surface 112 of the first workpieces 110, and a second opening, in the second surface 114 of the first workpiece 110. The aperture 115 has a depth equivalent to a thickness 116 of the first workpiece 110, at least in embodiments in which the first workpiece has a constant thickness.

The aperture 115 is configured and positioned on the first workpiece 110, and the stud 125 is configured and positioned on the second workpiece 120, so that the stud 125 can be received by the aperture 115. The aperture 115 should be sized and shaped such that the stud 125 can be received into the aperture 115. In one embodiment, the aperture 115 and stud 125 are sized and shaped to result in an interference, or snug fit between the stud 125 and the wall(s) of the aperture 115.

While the aperture 115 may have any of a wide variety of shapes without departing from the scope of the present technology, in one embodiment the aperture 115 has a generally circle shape as shown in the figures. In one embodiment, the aperture 115 has a generally oval shape. In various embodiments, the aperture 115 has another shape, such as square, or other rectangle, or another polygon.

In some embodiments, the first workpiece 110 additionally includes embossing 118 generally near the aperture 115. The embossing 118 may be applied or added to, formed in, or otherwise provided at the first surface 112 and/or the second surface 114 of the first workpiece 110 (illustrated in FIGS. 1 and 3).

The embossing 118 may form a pattern that can include protrusions within the first surface 112 of the first workpiece 110 and/or pockets (or indentations) on the second surface 114 of the first workpiece 110 corresponding to the protrusions on the first surface 112 of the first workpiece 110. The embossing 118 may include any of a wide variety of shapes, sizes, and patterns that can be formed in a pre-determined pattern carved, molded, or stamped as a design on the surface(s) of the first workpiece 110.

The protrusions and/or the pockets can enhance interlock of the workpieces 110, 120 during and after joining. Specifically, the protrusions on the first surface 112 of the first workpiece 110 enhance interlock between the first workpiece 110 and the softened material of the stud 125, for example, when forming a head 129 of a finished stake 127 is formed (best shown in FIG. 3). Additionally, the pockets enhance interlock of the second surface 114 of the first workpiece 110 and the first surface 122 of the second workpiece 120 by forming a void within the second surface 114 of the first workpiece 110 that is at least partially filled by material of the second workpiece 120 during heat staking (shown in FIG. 3).

In some embodiments, the second workpiece 120 includes the stud 125 configured to be inserted into the aperture 115 of the first workpiece 110. Configuration of the stud 125 can depend on any of multiple design factors, such as (i) whether a relatively high retention between the workpieces 110, 120 is needed, versus situations in which basic aligning and/or light securing of the first workpiece 110 to the second workpiece 120 is needed, and/or (ii) whether relevant design limitations exist, such as due to part-spacing constraints.

The stud 125 can have any of a wide variety of shapes and geometries including by being substantially or completely solid, partially or substantially hollow, or other. For example, the stud 125 may include a hollow portion, traditionally about a lengthwise center axis of the stud 125, to avoid sink marks on the second surface 124 of the second workpiece 120 after joining or where disassembly/reassembly of the heat-staked joint is desirable.

The stud 125, prior to joining, has a stud height 126 and a stud diameter 128 sized for a particular application (e.g., interference fit). The stud height 126 is greater than the thickness 116 of the first workpiece 110, such that when the first workpiece 110 is inserted onto the stud 125, a portion of the stud 125 remains exposed. Additionally, the stud height 126 can be directly correspond to the stud diameter 128. For example, the stud height 126 can be approximately 1.5 to 5 times the measurement of the stud diameter 128.

In one embodiment, the stud 125 can be mold material, which can be molded directly onto the first surface 122 of the second workpiece 120. In another embodiment, the stud 125 can be a separate material affixed to the first surface 122 of the second workpiece 120 during a manufacturing process. Alternatively, the separate material may be introduced during into the aperture 115 during joining.

The stud 125 is configured such that it softens at a predetermined glass transition temperature associated with the material. For example, thermoplastic materials have an operating temperature window approximately between −125° C. and 300° C. when assembled used with the joining system 100. The joining system 100 may require the temperature of material within the stud 125 to be high enough to soften the material, but not so high as to melt the material.

The first workpiece 110 and the second workpiece 120 may be similar in material structure. For example, the first workpiece 110 and the second workpiece 120 may both be composed of a polymer composite material. Conversely, the first workpiece 110 can be of a different material than the second workpiece 120. For example, the first workpiece 110 may be a composite material, while the second workpiece 120 may be an aluminum alloy.

In some embodiments, at least one of the workpieces 110, 120 include a polymer such as polycarbonate, polyolefin (e.g., polyethylene and polypropylene), polyamide (e.g., nylons), polyacrylate, or acrylonitrile butadiene styrene.

In some embodiments, at least one of the workpieces 110, 120 include a composite such as a reinforced thermoplastic. The plastics may include any of the exemplary polymers listed above, and the reinforcement may include one or more of clay, glass, carbon, polymer in the form of particulate, fibers (short or long), platelets, and whiskers, among others.

At least one of the workpieces 110, 120 can include synthetic, or inorganic, molecules. While use of so-called biopolymers (or, green polymers) is increasing, petroleum-based polymers are still much more common. Material of one or both of the workpieces 110, 120 may also include recycled material, such as a polybutylene terephthalate (PBT) polymer, which is about eighty-five percent post-consumer polyethylene terephthalate (PET). In one embodiment, one or both of the workpieces 110, 120 includes some sort of plastic. In one embodiment, the material includes a thermoplastic.

In one embodiment, one or both of the workpieces 110, 120 includes a composite. For example, in one embodiment one or both of the workpieces 110, 120 includes a fiber-reinforced polymer (FRP) composite, such as a carbon-fiber-reinforced polymer (CFRP), or a glass-fiber-reinforced polymer (GFRP). The composite may be a fiberglass composite, for instance. In one embodiment, the FRP composite is a hybrid plastic-metal composite (e.g., plastic composite containing metal reinforcing fibers). The material in some implementations includes a polyamide-grade polymer, which can be referred to generally as a polyamide. In one embodiment, the material of one or both of the workpieces 110, 120 includes acrylonitrile-butadiene-styrene (ABS). In one embodiment, the material of one or both of the workpieces 110, 120 includes a polycarbonate (PC). Material of one or both of the workpieces 110, 120 may also comprise a type of resin. Example resins include a fiberglass reinforced polypropylene (PP) resin, a PC/PBT resin, and a PC/ABS resin.

Figure 2:
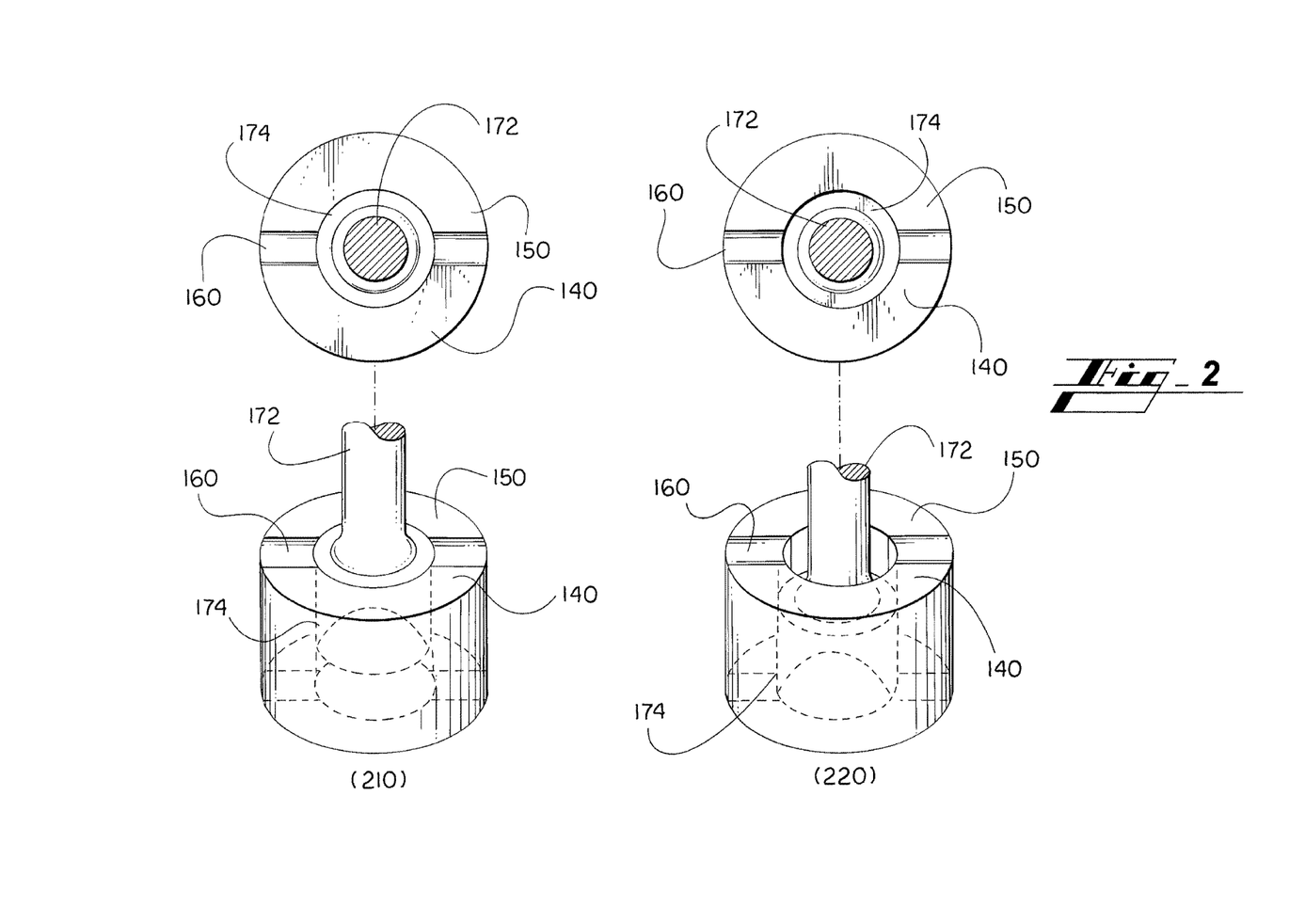
FIG. 2 illustrates a top view and corresponding perspective view of the punch assembly of FIG. 1 in an initial position and a deployed position.

Material of the stud 125 is softened and reformed are joined using a punch assembly 130. FIG. 2 illustrates a top view and corresponding perspective view of the punch assembly 130 in an initial position 210 and a deployed position 220.

The punch assembly 130 comprises a first electrode 140 and a second electrode 150 separated from contact by an insulator 160. Also included in the punch assembly 130 is a punch 170. The punch assembly 130 can attach the electrodes 140, 150, the insulator 160, and the punch 170 using any number of attaching means such as industrial adhesive, welding, and mechanical joining, among others.

The electrodes 140, 150 utilizes joule heating to apply single-sided resistance heat to the first workpiece 110, instead applying heat directly to the stud 125 as in conventional heat staking. In some embodiments, double-sided resistance heating can be applied to workpieces 110, 120. In double-sided resistance, one or more electrodes apply heating to the first surface 112 of the first workpiece 110 and the second surface 124 of the second workpiece 120.

In single-sided resistance, electrical current flows between the electrodes 140, 150 providing conduction within the electrodes 140, 150. Specifically, electrical current flows from the first electrode 140 through the first workpiece 110 and to the second electrode 150. The electrodes 140, 150 allow electrical current to flow through the first workpiece 110, causing heating of the material of the first workpiece 110. Heating of the first workpiece 110 in turn softens a portion of the material of the stud 125, which allows formation of a finished stake 127.

Where embossing 118 is present on the first workpiece 110, the electrodes 140, 150 are positioned outside the protrusions located on the first surface 112 of the first workpiece 110, allowing current flow through the first workpiece 110.

The electrodes 140, 150 may be shaped and sized to fit the application. For example, the electrodes 140, 150 may be shaped as flat plates and arranged linearly (e.g., stacked or side-by-side). Alternatively, the electrodes 140, 150 may be shaped cylindrically and arranged concentrically, allowing the first electrode 140 to be received into a cavity formed within the second electrode 150.

Targeted heat transfer to material of the first workpiece 110, softens material of the stud 125 through conductive heating. The conductive heating of the material of the stud 125 facilitates softening of that material, which can then be reformed to produce the finished stake 127 that joins the workpieces 110, 120.

The electrodes 140, 150 can be made of a combination base metals such as iron, nickel, and zinc among others. Alternatively, or in addition to, the electrodes 140, 150 can include materials corrosion or oxidation resistant materials such as, but not limited to, copper, silver, and gold.

The insulator 160 is configured to electrically isolate the first electrode 140 from the second electrode 150, without allowing current through the insulator 160 itself. The insulator 160 is configured to surround a portion of the punch assembly 130 (e.g., a probe tip, illustrated in FIG. 2 and described below) to prevent electrical current from passing through a portion of the punch assembly 130 (e.g., a shaft, illustrated in FIG. 2 and described below) in connection with an operating mechanism (e.g., robot).

The insulator 160 can include any number of materials that inadequately conduct electricity. For example, the insulator 160 can comprise materials such as glass, ceramic (e.g., sintered aluminum oxide), porcelain, rubber, plastic, and other materials that can withstand the temperature increase of the material of the punch assembly 130 and workpieces 110, 120 during heat-staking.

The punch 170 comprises a shaft 172 including a probe tip 174, which are affixed together and positioned between the electrodes 140, 150 and the insulator 160. The punch 170 creates the finished stake 127, which comprise the head 129, in some embodiments (illustrated in FIG. 3).

The shaft 172 provides a means of controlling the probe tip 174 movement and direction during punching. In some embodiments, the shaft 172 is a hand-held device utilized by an operator during punching. In such embodiments, the shaft 172 may include items such as hand grips or other features to facilitate ease of operation. In some embodiments, the shaft 172 is a device which is inserted into a robot or other operational device, which executes movement of the shaft 172 during punching.

The probe tip 174 includes a molding that produces the geometry of the finished stake 127. For example, the probe tip 174 illustrated in FIGS. 1 and 2 includes a dome geometry. In some embodiments, the punch 170 is designed such that during tooling changes, the punch 170 can conveniently be replaced with any probe tip 174 suitable for a desired application. For example, a dome-head probe tip can be quickly interchanged for a rosette-head probe tip without additional time to change out the entire punch assembly 130.

In some embodiments, the probe tip 174 can be heated during compression. Where the probe tip 174 is heated, additional thermal energy is transferred to material of the stud 125 aiding in reformation. Additional thermal energy may be desirable where heating of the first workpiece 110 may cause deformity to the material or the hole. For example, where the glass transition temperate of the stud 125 is higher than that of the first workpiece 110, heating the probe tip 174 may be desirable.

In a contemplated embodiment (not shown in detail), material of the stud 125 is heated by energy from the probe tip 174 such as ultrasonic energy and laser energy among others. Where the stud 125 is softened by contact with the probe tip 174, the electrodes 140, 150 may not be required. Instead, the energy from the probe tip 174, e.g., functioning as a weld horn, produces sufficient energy to soften the material of the stud 125. The punch 170 then forms the softened material of the stud 125, forming the finished stake 127.

Figure 3:
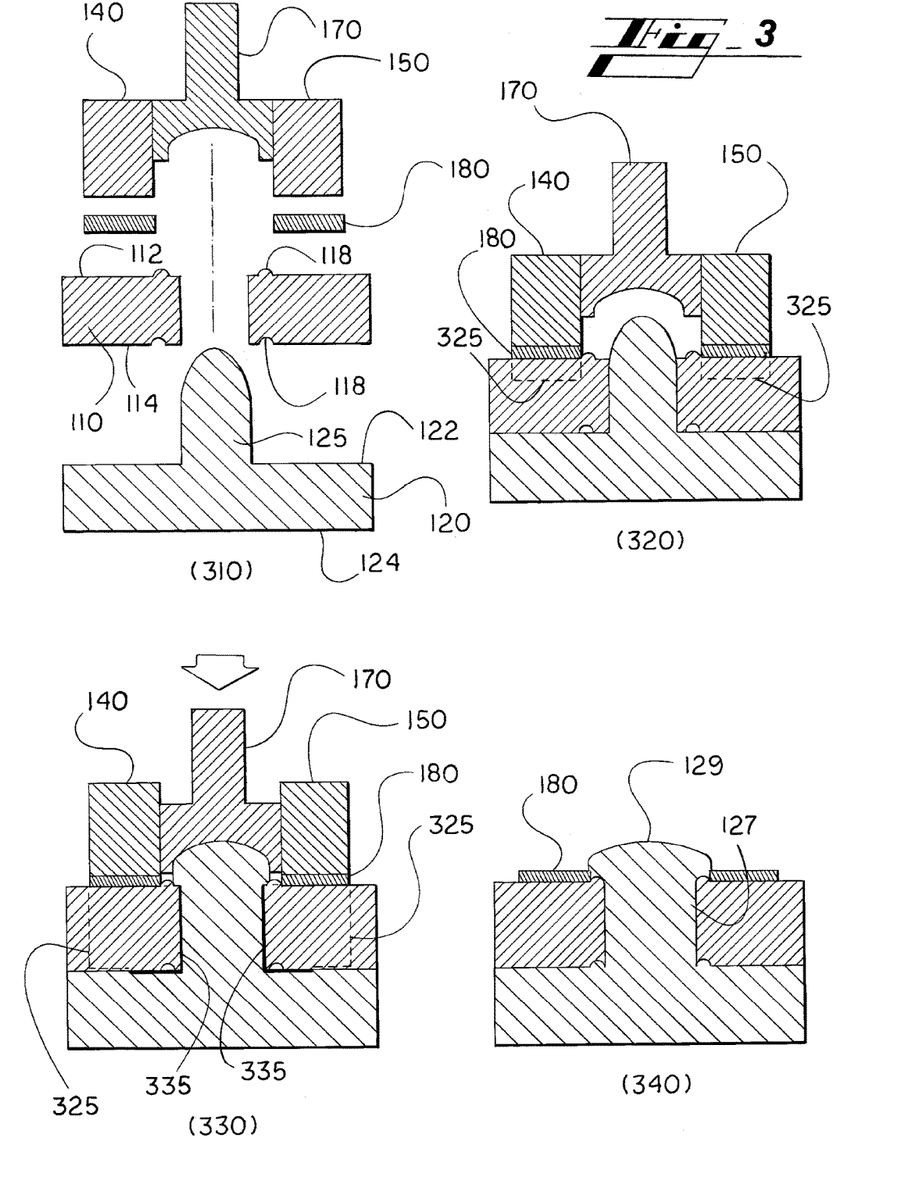
FIG. 3 illustrates a cross-sectional view of a heat-staking process using a portion of the joining system of FIG. 1.

The head 129 of the finished stake 127 can be sized and shaped for a particular application. For example, the probe tip 174 can be configured to generate a geometry such as a dome-head, a hollowed stake, and a flush-stake, rosette-head, among others. The shape of the head 129 can include a high-profile or low-profile with reference to the first surface 112 of the first workpiece 110.

In the initial position 210, the probe tip 174 is positioned approximately flush with a top of the electrodes 140, 150. In this position, the probe tip 174 has not been compressed to contact the stud 125.

In the deployed position 220, the punch 170 is compressed to reform material the stud 125, producing the finished stake 127. The probe tip 174 moves along a cavity formed by the electrodes 140, 150 and the insulator 160.

In some embodiments, where the first workpiece 110 and the second workpiece 120 are composed of similar non-conductive materials, a washer 180 is present to provide conductivity during heat-staking. For example, when the workpieces 110, 120 are both a polymer composite material, the washer 180 may be present to provide conductivity. The washer 180 is positioned on the first surface 112 of the first workpiece 110 (as illustrated in FIGS. 1 and 3).

The washer 180 is composed of a conductive material (e.g., metal or metal composite). Where the workpiece containing the aperture 115 (e.g., first workpiece 110) is composed of a conductive material, heat-staking can occur without the washer 180. For example, where the first workpiece 110 is an alloy (e.g., aluminum alloys) and the second workpiece 120 is a thermoplastic (e.g., carbon fiber reinforced/nylon composite), formation of the finished stake 127 may occur without the presence of the washer 180 because the alloy material of the second workpiece 120 serves a conductive function similar to the washer 180.

Where the washer 180 is not present, the softening temperature for the second workpiece 120 is not to exceed the melting temperature of the first workpiece 110. In the above example where the first workpiece 110 is an alloy and the second workpiece 120 is a thermoplastic, the alloy material of the first workpiece 110 has higher melting temperature than that of the thermoplastic material of the second workpiece 120.

II. METHODS OF JOINING—FIG. 3

FIG. 3 illustrates joining of the first workpiece 110 and the second workpiece 120 using the punch assembly 130 for heat staking. The heat staking is beneficial because local heating result in little to no damage to surrounding components.

Although the primary example herein describes joining of the first workpiece 110 and the second workpiece 120, the technology can also be used to join three or more workpieces. Each additional workpiece includes apertures 115 which allow receipt of the stud 125. Each additional workpiece may include similar characteristics (e.g., material composition) and features (e.g., embossing) of the first workpiece 110. Where additional workpieces are joined, the height 126 of the stud 125 is extended such that a portion of the stud 125 protrudes from the first surface of the first workpiece 110 to allow contact with the punch assembly 130 for formation of the finished stake 127.

At step 310, the aperture 115 of the first workpiece 110 is positioned to receive the stud 125 of the second workpiece 120. The stud 125 of the second workpiece 120 protrudes through the aperture 115 in the first workpiece 110 to be locked in place. The workpieces 110, 120 are positioned for joining with clamping force is applied to the workpieces 110, 120. Components such as spring plungers, among others, can be designed to compress the punch assembly 130 to the first surface 112 of the first workpiece 110 and ensure proper contact between the workpieces 110, 120.

As described above, where the first workpiece 110 and the second workpiece 120 are both composed of non-conductive materials, the washer 180 may be present to provide conductivity during heat-staking. However, where the workpiece containing the aperture 115 (e.g., first workpieces 110) contains a conductive material, heat-staking can occur without the presence of the washer 180 because the material of the workpiece serves a conductive function similar to the washer 180.

At step 320, energy is applied to the first surface 112 of the first workpiece 110. In some embodiments, energy (e.g., electrical current) is applied to the first workpiece 110 using the electrodes 140, 150, described above. An energy transfer area 325 (illustrated as an area defined by a set of dashed lines) initially forms where the electrodes 140, 150 are in contact with the first surface 112 of the first workpiece 110. The energy transfer area 325 expands towards the stud 125 as the electrodes 140, 150 continue to operate. Stated another way, indirect heating of the stud 125 occurs by way of conductive energy transfer between the material of the first workpiece 110 and material of the stud 125. Indirect heating softens material of the stud 125, ultimately allowing the finished stake 127 to form during punching.

In some embodiments, energy is applied to the punch 170 in addition to or instead of the first surface 112 of the first workpiece 110. As the electrodes 140, 150 increase the temperature of the punch 170, direct heating of material within the stud 125 softens, ultimately allowing the finished stake 127 to form during punching. Alternate or complementary embodiments can use with hot air (hot-air staking), a heated tool (thermal staking), ultrasonic (ultrasonic staking), or infrared light (using radiation as heat transfer mode) to heat the punch 170.

At step 330, formation of the finished stake 127 begins through compressional force (illustrated as an arrow) exerted on the punch assembly 130. The punch assembly 130 is compressed onto the stud 125 for a predetermined hold time to form the finished stake 127. Progressive softening of material of the stud 125 under continuous pressure forms the finished stake 127 including the head 129. Specifically, the probe tip 174 contacts material of the stud 125, which softens and fills a cavity formed within the probe tip 174 (e.g., a dome cavity as illustrated).

During forming, the energy transfer area 325 expands to include additional material of the first workpiece 110. As expansion of the energy transfer area 325 (illustrated as darkened lines) forms a high temperature area 335 at the interface of the aperture 115 and the stud 125. The high temperature area 335 provides indirect heating to material of the stud 125, which aids in formation of the finished stake 127 during compression by the punch 170.

Formation of the stake can be low impact (e.g., 15-25 pounds of force), where the stud 125 is heated evenly, through direct heating or indirect heating, and low force is applied. During low-impact formation, the amount of force required in formation of the finished stake 127 directly relates to the material and diameter 128 of the stud 125. Additionally, low impact formation may be beneficial to prevent damage to components in proximity of area affected by heat staking.

In some embodiments, the punch 170 is heated by the electrodes 140, 150 and compressed with the material of the stud 125 that protrudes through the aperture 115, beyond the first surface 112 of the first workpiece 110. At the end of the heating cycle, the electrodes 140, 150 are switched off and the punch 170 is activated which forms over softened material of the stud 125.

In some embodiments, the predetermined hold time include cooling of the punch 170. Cooling may be useful where the material of the stud 125 is directly heated by the punch 170. In these embodiments, the punch 170 may be held on the softened material of the stud 125 until the material forms the finished stake 127. Alternatively or in combination, the punch 170 may be cooled (e.g., cooled air) until the material forms the finished stake 127.

Also during formation, the embossing 118 can create additional interlock. The embossing 118 on the first surface 112 of the first workpiece 110, in contact with the punch assembly 130, begin to deform, flatten, and/or join with material of the stud 125 that becomes the head 125, as the punch assembly 130 creates heating and compressional force. The embossing 118 on the second surface of first workpiece 110, in contact with the second workpiece 120, begin to deform, flatten, and fill with material from the second workpiece 120 to enhance interlock between the workpieces 110, 120.

At step 340, after the predetermined hold time has ended, the punch assembly 130 retracts, either manually or automatically. When joined, the stud 125 forms the finished stake 127, including the head 129 in some embodiments.

III. SELECT FEATURES OF THE PRESENT TECHNOLOGY

Many features of the present technology are described herein above. The present section presents in summary some selected features of the present technology. The present section highlights only a few of the many features of the technology and the following paragraphs are not meant to be limiting.

One benefit of the present technology is the workpieces are joined utilizing single-sided or double-sided heating of a punch assembly. The punch assembly includes two or more electrode that are switched into a conductive state for a predetermined period of time during which a punch is compressed into material of a stud.

Another benefit of the present technology is the joining system utilizes indirect heating of the stud to form the stake. The heat stake is formed through conductive heating of a stud material through indirect heating of a workpiece material. Targeted heat transfer to material of the first workpiece, softens material of the stud through conductive heating, thus minimizing heat transfer to the stud. The conductive heating of the material of the stud facilitates softening of that material, which can then be reformed to produce a finished stake that joins the workpieces.

Yet another benefit of the present technology is the punch assembly is configured to form differing stake geometries. The punch within the punch assembly is designed such that during tooling changes, the punch can be replaced with different probe tips suitable for a desired application.

IV. CONCLUSION

Various embodiments of the present disclosure are disclosed herein. The disclosed embodiments are merely examples that may be embodied in various and alternative forms, and combinations thereof.

Variations, modifications, and combinations may be made to the above-described embodiments without departing from the scope of the claims. All such variations, modifications, and combinations are included herein by the scope of this disclosure and the following claims.

What is claimed is:

1. A method, for joining a first workpiece to a second workpiece, the first workpiece having a first surface, a second surface opposite the first surface, and an aperture having a first width, the second workpiece having a third surface and a stud extending from the third surface, the method comprising:
   positioning the first workpiece adjacent the second workpiece with the second surface contacting the third surface and the stud extending through the aperture;
   positioning, axial to a centerline of the stud, an electrical-conducting punching device comprising (i) a first electrode arranged and configured to contact the first surface adjacent the aperture and adjacent the stud, (ii) a second electrode, connectably attached to and electrically isolated from the first electrode and arranged and configured to contact the first surface adjacent the aperture and adjacent the stud, and (iii) a punch movably positioned between the first electrode and the second electrode within the electrical-conducing punching device;
   applying energy using the first electrode to heat a first portion of the first surface of the first workpiece and the second electrode to heat a second portion of the first surface of the first workpiece, wherein the energy is applied to the first portion and the second portion to soften material of the stud; and
   compressing, using the punch, the softened material of the stud, yielding a stake forming a joint connecting the first workpiece and the second workpiece.

2. The method of claim 1 wherein the first electrode and the second electrode form a passage between them having a second width being greater than the first width.

3. The method of claim 1 wherein the punch includes a probe tip having a third width being greater than the first width.

4. The method of claim 1 wherein the punch includes a probe tip having a cavity of a first predetermined geometry, forming in the stake a convex head corresponding to the first predetermined geometry.

5. The method of claim 1 further comprising an insulator positioned between the first electrode and the second electrode to electrically isolate the first electrode and the second electrode.

6. The method of claim 1 wherein the first workpiece includes, at least partially surrounding the aperture, an embossed pattern having protrusions on the first surface and indentations on the second surface, the protrusions configured to enhance interlock between the first surface and the softened material of the stud when compared to interlock between the first surface and the softened material when protrusions are not present and the indentations configured to enhance interlock between the second surface and the third surface when compared to interlock between the second surface and the third surface when the indentations are not present.

7. The method of claim 1 further comprising positioning, between the first surface and an edge of a probe tip, a washer to contact the first surface.

8. A method, for joining a first workpiece to a second workpiece, the first workpiece having a first surface, a second surface opposite the first surface, and an aperture having a first width, the second workpiece having a third surface and a stud extending from the third surface, the method comprising:
  positioning the first workpiece adjacent the second workpiece with the second surface contacting the third surface and the stud extending through the aperture;
  positioning, axial to a centerline of the stud, an electrical-conducting punching device comprising (i) a first electrode arranged and configured to contact a first portion of the first surface adjacent the aperture and adjacent the stud, (ii) a second electrode arranged and configured to contact a second portion of the first surface adjacent the aperture and adjacent the stud, (iii) an insulator positioned between the first electrode and the second electrode, and (iv) a punch movably positioned between the first electrode and the second electrode within the electrical-conducing punching device;
  applying energy using the first electrode to heat the first portion of the first surface and the second electrode to heat the second portion of the first surface, wherein the energy applied to the first portion and the second portion to soften material of the stud; and
  compressing, using the punch, the softened material of the stud, yielding a stake forming a joint connecting the first workpiece and the second workpiece.

9. The method of claim 8 wherein the first electrode and the second electrode form a passage between them having a second width being greater than the first width.

10. The method of claim 8 wherein the punch includes a probe tip having a third width being greater than the first width.

11. The method of claim 8 wherein the punch includes a probe tip having a cavity of a first predetermined geometry, forming in the stake a convex head corresponding to the first predetermined geometry.

12. The method of claim 8 wherein the first workpiece includes, at least partially surrounding the aperture, an embossed pattern having protrusions on the first surface and indentations on the second surface, the protrusions configured to enhance interlock between the first surface and the softened material of the stud when compared to interlock between the first surface and the softened material when protrusions are not present and the indentations configured to enhance interlock between the second surface and the third surface when compared to interlock between the second surface and the third surface when the indentations are not present.

13. The method of claim 8 further comprising positioning, between the first surface and an edge of a probe tip, a washer to contact the first surface.

* * * * *